United States Patent [19]

Thaler

[11] 3,962,605
[45] June 8, 1976

[54] HIGH-SPEED GROUNDING APPARATUS FOR METAL ENCAPSULATED HIGH-VOLTAGE INSTALLATIONS

[75] Inventor: Richard Thaler, Unterentfelden, Switzerland

[73] Assignee: Sprecher & Schuh AG, Aarau, Switzerland

[22] Filed: May 28, 1975

[21] Appl. No.: 581,685

[30] Foreign Application Priority Data
June 13, 1974 Switzerland.......................... 8125/74

[52] U.S. Cl. ................................ 317/16; 174/11 R; 200/61.08; 317/11 R
[51] Int. Cl.² .......................................... H02H 7/22
[58] Field of Search ................. 317/16, 11 R, 11 E, 317/60 R, 76; 200/61.08, 82 B, 83 W; 174/11 R; 337/401, 407–410; 102/81

[56] References Cited
UNITED STATES PATENTS
2,103,816  12/1937  Hart................................ 174/11 R
2,929,892  3/1960  Blomgren................... 200/61.08 X
3,896,621  7/1975  Sawyer....................... 200/61.08 X Primary Examiner—J D Miller
Assistant Examiner—Patrick R. Salce
Attorney, Agent, or Firm—Haseltine, Lake & Waters

[57] ABSTRACT

A high-speed grounding apparatus for metal encapsulated high-voltage switching installations embodying a grounding bolt which, by igniting a propellent charge, can be forwardly shifted out of its rest position into its grounding or earthing position for electrically connecting the capsule with a conductor encapsulated therein. An ignition device is provided for the propellent charge, this ignition device being triggered by an increase in pressure in the switching installation.

9 Claims, 3 Drawing Figures

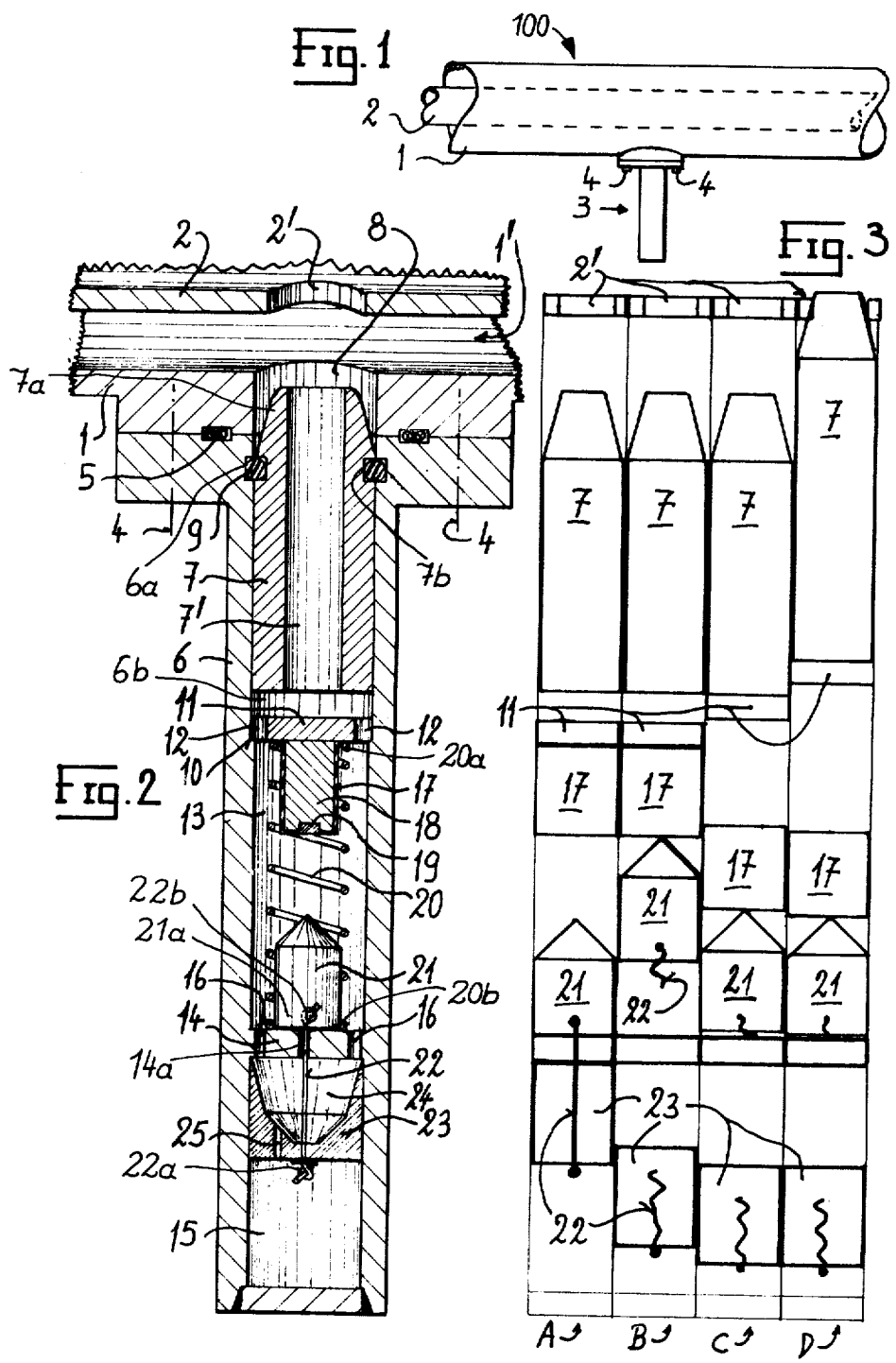

3,962,605

HIGH-SPEED GROUNDING APPARATUS FOR METAL ENCAPSULATED HIGH-VOLTAGE INSTALLATIONS

BACKGROUND OF THE INVENTION

The present invention relates to a new and improved construction of a high-speed or rapid grounding device for metal encapsulated high-voltage switching installations comprising a grounding bolt which, upon igniting a propellent charge, can be forwardly shifted or otherwise displaced out of its rest position into its grounding or earthing position in order to electrically connect the capsule with a conductor encapsulated therein.

In the case of metal encapsulated high-voltage switching installations, especially those filled under pressure with $SF_6$ (sulphur hexafluoride) as the insulating gas, it can happen that upon occurrence of arcs between the conductor and the capsule the resultant rapid heating and expansion of the gas can cause rupture of the capsule. Furthermore, if the arc burns for a sufficiently long time the installation can be otherwise damaged until destruction. In any event, a significant danger is present both for human beings and the installation and such danger must be obviated. In order to prevent bursting or rupture of the capsule or the like there was heretofore proposed an overpressure safety device employing rupture membranes or diaphragms. To extinguish the arcs there was strived for rapid cut-off of the current i.e., high-speed grounding. In those cases of the prior art relying upon the use of rupture or bursting membranes it was proposed for the purpose of controlling the switching operations to employ the pressure drop and/or the further inflow of gas from supply containers in order to trigger the switching operations. Yet, with these prior art proposals there had to be accepted quite considerable time-delays, so that due to further burning of the arc the installation was heavily damaged. Moreover, owing to bursting or rupture of the membrane or diaphragm there had to be accepted at least a partial loss of the gas fill. Additionally, there could not be attained an effective complete protection of the operating personnel.

There has also been proposed in this art, in addition to the use of rupture or bursting membranes, to rely upon the increased current, which arises upon the presence of arcs, for triggering switching operations. If, however, the total current remains within the rated current range, then, notwithstanding the presence of arcs no switching operation takes place. Even if the rated current is exceeded response of the switch is nonetheless critical inasmuch as its response time inherently cannot be so short that a switching operation already occurs in the presence of brief overcurrent surges. Hence, the switching operation occurs at such a large point in time that it is not possible to effectively prevent damage to the installation because of arc formation. It has also already been proposed to incorporate into the installation reference arc locations at which the arc destructs a rupture or bursting membrane and there is strived for an immediate or instantaneous extinguishing of the arc in that the one electrode is distanced from the other electrode by the outflowing gas. The cutting-off or grounding of the installation is undertaken in the already described manner, that is to say, with a time-delay. Moreover, it is really questionable whether there can actually occur in this way an extinguishing of the arc. Additionally, there is not eliminated the drawback that gas flows out of the installation.

SUMMARY OF THE INVENTION

Hence, with the foregoing in mind it is a primary object of the present invention to provide a high-speed grounding apparatus for encapsulated high-voltage switching installations which is not associated with the aforementioned drawbacks and shortcomings of the prior art proposals discussed above.

Another and more specific object of this invention aims at the provision of a novel apparatus which, to the extent possible is capable of operating without the use of rupture membranes and loss in gas, is capable of extinguishing an arc with such rapidity that there can be avoided damage to the installation and danger to the operating personnel, and without having to influence the response times of the normal or standard power switch.

Now in order to implement these and still further objects of the invention, which will become more readily apparent as the description proceeds, the high-speed grounding apparatus of the previously mentioned type and as contemplated by this development is manifested by the features that there is provided an ignition device for the propellent charge and which ignition device is triggered by a pressure increase within the switching installation.

By virtue of the fact that there is provided an ignition device which can be triggered or rendered operable due to an increase in pressure in the switching installation, it is possible, in contrast to the state-of-the-art devices of the type wherein the pressure drop or the further inflow of replenishment gas due to the pressure drop triggers a switching operation, to bring about a forward time-shift of the switching operation.

The use of a propellent charge for forwardly shifting or otherwise suitably displacing a grounding bolt has the advantage, in contrast to the inherently large massive spring force storage devices, that there is possible a more precise tuning or matching of the trigger or release characteristics and a more rapid response. Even a relatively small propellent charge can provide the required large switching forces for which otherwise there would be necessary a significantly larger spring force storage device as concerns its mass and volume. The ignition of the propellent charge can occur by means of a small, simple spring or elastic force storage device since, in this case, a small force is adequate for successful operation. Such a small spring force storage device can be advantageously easily triggered or operated. Moreover, the small movable masses thus respond with very little time-delay.

If in accordance with a preferred technique there is sampled or sensed the pressure differential between two compartments or chambers which are interconnected with one another to permit gas flow therebetween through the agency of an equalization opening in order to bring about the triggering or response operation and wherein one compartment is connected for gas flow with the interior of the installation, then it is also possible to take into account the speed with which the pressure increases in the installation. The equalization or compensation opening of both compartments or chambers can be calibrated such that there can be compensated a gas expansion due to normal heating without a switching operation occurring, but on the other hand a rapid pressure increase due to an arc cannot be compensated quickly enough, resulting in response of the triggering operation. The pressure differential can be advantageously translated into the movement of a piston which separates both compartments. However, there can also be used an excess-pressure or relief valve which is arranged between the compartments for triggering the ignition of the propellent charge. It is particularly advantageous if this triggering operation can occur in that a tearable thread which interconnects the piston with an ignition or firing bolt, which is exposed to the action of a stressed or biased spring, ruptures in response to movement of the piston brought about by the excess pressure. In this way there can be achieved in a simple manner an outstanding accuracy of the apparatus and there can be prevented that there are necessary the otherwise conventional movable apparatus components for spring force storage devices, such as pawls and the like, the function of which cannot be positively controlled if the expenditure in the design of the apparatus is maintained within tolerable limits.

The fact that there is possible with the invention a simple construction affords the beneficial result that the apparatus can be manufactured so inexpensively that it can be provided at every possibly endangered conductor section, resulting in optimum safety. Since it is thus possible to avoid long gas columns, there is possible a further increase in the response speed. Additionally, the proximity of the grounding location with respect to the arc constitutes a further advantage.

With the heretofore discussed preferred constructional embodiments there is additionally advantageous the simple mechanical triggering of the ignition operation, which is directly capable of being actuated by the pressure increase due to the arc, since no functions dependent upon the current intensity of the arc must be converted electromechanically into a movement, so that as a result thereof there can be also realized a rapid response.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is a schematic view of a section of an encapsulated conductor or line equipped with a high-speed grounding apparatus constructed according to the teachings of the present invention;

FIG. 2 is an enlarged longitudinal sectional view through the high-speed grounding apparatus depicted in FIG. 1; and FIG. 3 is a schematic block diagram illustration of different phases of the rapid or high-speed grounding operation carried out with the apparatus depicted in FIG. 2.

DETAILED DESCRIPTION OF THE INVENTION

Describing now the drawing, the conductor or line section 100 of a high-voltage switching installation embodies a substantially tubular-shaped high-voltage conductor or line 2 which is centrally supported in conventional manner by not particularly illustrated insulators in a grounded metallic capsule or housing 1. The capsule 1 is sealed in any suitable and conventional manner and filled with an insulating gas, typically $SF_6$ (sulphur hexafluoride).

This conductor section 100 is provided with a high-speed grounding apparatus, generally designated in its entirety by reference character 3. As best seen by referring to FIGS. 1 and 2 this high-speed or rapid grounding apparatus 3 is exchangeably mounted at a connection location provided for this purpose at the capsule 1 by means of screws 4 or any other suitable fastening elements while interposing appropriate seal means 5. The high-speed grounding apparatus 3 embodies a substantially cylindrical jacket or casing 6 in which there is displaceably guided the hollow grounding bolt 7 having a continuous or open-ended bore 7', this grounding or earthing bolt 7 having a substantially conical front end 7a. The hollow grounding bolt 7 can be displaced within the cylindrical jacket or casing 6 and specifically can be forwardly shifted or advanced through an appropriately configured hole or aperture 8 provided in the capsule 1 and furthermore, by means of its conical front or forward end 7a can be pushed into a smaller hole or aperture 2' of the conductor 2 serving as a counter-contact, in order to establish a ground-short between the conductor or line 2 and the capsule 1. Now in order to secure the grounding or earthing bolt 7 —hereinafter usually conveniently simply referred to as the grounding bolt 7— in its rest position as the same has been shown in FIG. 2 (and as also schematically shown in column A of FIG. 3) and in order to establish a good contact between the grounding bolt 7 and the shell or casing 6 of the grounding apparatus 3 a holding or holder ring 9 formed of a suitable metal is inserted in appropriately formed annular grooves 6a and 7b of the casing 6 and grounding bolt 7 respectively.

Continuing, in the showing of FIG. 2 there will be recognized that beneath the grounding bolt 7 there is supported by a force or press fit a disk 11 serving as a plug which is seated at a shoulder 10 formed at the inner wall or surface 6b of the casing 6. This disk or plate 11 is provided at spaced locations about its marginal edge with throughpassage openings or bores 12 serving to flow communicate the compartment or chamber 13 located behind the plug-like disk 11 with the open-ended or continuous bore 7' of the grounding bolt 7 and thus to provide a gas flow passage or communication between the compartment 13 and the hollow space or compartment 1' between the conductor or line 2 and the capsule 1 in the rest position of the grounding bolt 7 as best seen by referring to FIG. 2. Also as will be recognized by inspecting FIG. 2 the compartment 13 is delimited at its lower end by means of a support or abutment 14 fixedly connected with the shell or casing 6 in any suitable manner. The compartment or chamber beneath the support 14 has been generally designated by reference character 15 and once again is in gas flow communication with the chamber or compartment 13 by virtue of the throughpassage openings or bores 16 provided in the support 14.

At the underside of the disk 11 there is mounted a cartridge 17 equipped with a propellent charge 18 and a detonator cap 19. Also anchored to the underside of the disk 11 is one end 20a of a spiral tension spring 20 or equivalent structure. The other end 20b of spring 20 is connected with the lower end of an impact or firing bolt 21 or the like, this spring 20 additionally serving as a lengthwise guide for such impact or firing bolt 21, also sometimes referred to as a firing pin. In the showing of FIG. 2 the spring 20 is stressed or biased. The firing bolt or pin 21 is secured at one end 21a at a tearable thread 22 or the like, for instance formed by a wire, this tearable thread 22 being guided through a hole or bore 14a of the support 14 and the other end 22a of the tearable thread 22 which is remote from the end 22b attached to the firing bolt or pin 21 is secured at a piston or piston member 23 seated within the compartment or chamber 15. In the rest position of the grounding bolt 7 as shown in FIG. 2 the firing bolt or pin 21 is suspended at the thread 22 which operatively connects such firing bolt with the piston member 23, so that such piston member bears against the lower surface of the support 14 under the action of the tearable thread 22 which is stretched or stressed by the spring 20. The piston member 23 is provided with a hollow cavity or recess 24 which is in flow communication via the bores or throughpassage openings 16 with the hollow compartment 13. This hollow cavity 24 is also in flow communication via an accurately calibrated equalization or compensation bore 25 at the base of the piston member 23 with the portion of the compartment 15 below the base of the piston member 23 and not occupied thereby. The piston member 23 is displaceably seated in this hollow compartment or chamber 15.

Hence, it is to be appreciated that gradual pressure changes, for instance owing to fluctuations in the ambient temperature, which arise between the compartments 1' and 15 can be compensated by means of the bore 7', the bores 12, the compartment 13, the bores 16, the hollow cavity or recess 24 and the bore 25. Now if however owing to the occurrence of an arc between the capsule 1 and the conductor or line 2 there arises a rapid pressure increase in the hollow space or compartment 1', then the pressure increase is capable of rapidly propogating through the relatively large surface cross-sectional areas of the bore 7', the bores 12, the compartment or chamber 13 and the bores 14 up to the hollow cavity 24 of the piston member 23, but cannot rapidly propogate through the relatively narrow equalization or compensation bore 25. The sudden pressure increase thus leads to a large pressure differential at opposite faces of the piston member 23, and as a result thereof this piston member 23 is displaced downwardly. Consequently, the thread 22 or the like ruptures and the firing bolt or pin 21, as for instance schematically shown in column B of FIG. 3, is propelled upwardly through the action of the biased spring member 20. Hence, the thus propelled ignition or firing bolt 21 impacts against the detonator cap 19 which, in turn, ignites the propellent charge 18. This ignition of the propellent charge 18 immediately propels the disk 11 upwardly, as schematically indicated in the showing of column C of FIG. 3, so that disk 11 closes the bore 7' in the grounding bolt 7. Hence, the instantaneous and pronounced pressure increase in the compartment 13 caused by the ignition of the propellant charge 19 displaces, and specifically forwardly shifts the grounding bolt 7 upwardly into the grounding position portrayed schematically in column D in FIG. 3. The grounding bolt 7 thus wedges by means of its conical end 7a in the hole or aperture 2' of the conductor or line 2.

This entire operation occurs very rapidly. In contrast to spring force-drive storage devices, which are much more voluminous and massive, the required triggering or release force is relatively small and can be preset or predetermined extremely precisely since it is only necessary to rupture an appropriately calibrated thread 22 or similar structure. Also the remaining dimensions, especially the cross-sectional areas of the components or structures 7', 12, 13, 16 and 25 can be easily reproducibly calibrated with great precision in order to carry out the intended function, thereby eliminating any subsequent adjusting work. The triggering action which occurs practically immediately after the sudden pressure increase is also assisted by the very high possible acceleration of the firing or ignition bolt 21 which possesses a small mass and brought about by the action of the spring 20, the directly following ignition or firing of the propellent charge and the so-to-speak instantaneous "shooting" of the grounding bolt 7 into the grounding position, as shown in column D of FIG. 3. The entire operation can be equated to the firing of a shot and occurs so rapidly that in actual practice there expires at most only a few hundreths of a second from the time that the arc occurs until it is extinguished by the ground-short. Even then there still remains an adequate reserve in response time if the arc does not appear at the direct neighborhood of the grounding device. Since, however, the grounding device can be fabricated extremely economically it can be installed at relatively small spaced locations along the switching installation, thus further increasing the security of the system.

Similar results as achieved with the illustrated exemplary system can also be attained if there is employed as the pressure differential trigger another appropriately designed excess presssure device for the ignition or firing of the propellent charge.

While there is shown and described present preferred embodiments of the invention, it is to be distinctly understood that the invention is not limited thereto, but may be otherwise variously embodied and practiced within the scope of the following claims.

Accordingly, what is claimed is:

1. A high-speed grounding apparatus for a metal encapsulated high-voltage switching installation incorporating a conductor, a capsule for encapsulating said conductor, said high-speed grounding apparatus comprising a grounding bolt displaceable between a rest position into a grounding position for electrically connecting the capsule with the therein encapsulated conductor, a propellent charge which when ignited displaces the grounding bolt out of its rest position into its grounding position, and an ignition device provided for the propellent charge, said ignition device being triggered in response to a pressure increase prevailing in the switching installation.

2. The high-speed grounding apparatus as defined in claim 1, further including mechanical triggering means for triggering the ignition device.

3. The high-speed grounding apparatus as defined in claim 2, wherein the ignition device comprises a firing bolt movable from a rest position into a firing position for igniting the propellent charge, spring means acting upon said firing bolt such that upon relaxation of said spring means said firing bolt is moved out of its rest position into its firing position.

4. The high-speed grounding apparatus as defined in claim 2, wherein said triggering means comprises means defining two compartments, means providing an equalization opening for gas flow communicating said two compartments with one another, one of said compartments being gas flow connected via throughpassage means with the interior of the switching installation, said throughpassage means possessing a total cross-sectional area which is greater than the cross-sectional area of the equalization opening, and means for sensing a pressure differential between both of said compartments.

5. The high-speed grounding apparatus as defined in claim 4, wherein said means defining said two compartments comprises a casing, said means for sensing said pressure differential between said two compartments comprising a piston member displaceable in said casing which defines a cylinder for said piston member, said piston member having opposed faces, each of said compartments being arranged at one respective side of the opposed faces of said piston member.

6. The high-speed grounding apparatus as defined in claim 5, wherein the ignition device comprises a firing bolt movable out of a rest position into a firing position, pre-biased spring means acting upon said firing bolt such that upon relaxation of said pre-biased spring means said firing bolt is moved out of its rest position into its firing position, and a tearable thread for connecting the piston member with said firing bolt.

7. The high-speed grounding apparatus as defined in claim 6, wherein the equalization opening is provided in the piston member between both of said compartments.

8. The high-speed grounding apparatus as defined in claim 7, wherein said capsule has a wall provided with an opening, said casing being connected in gas flow communication via said opening with the interior of said capsule, said grounding bolt being displaceably mounted in said casing, said grounding bolt having a throughpassage bore, said grounding bolt having an end which faces away from said capsule, a disk member spaced from said end of said capsule and movable into contact with the end of said capsule when the propellent charge is ignited in order to close the throughpassage bore of said grounding bolt, said disk member having a marginal region provided with bore means.

9. The high-speed grounding apparatus as defined in claim 8, wherein said disk member delimits one of said compartments from the grounding bolt, said one compartment containing the propellent charge and the firing bolt and its pre-biased spring means, a support for said piston member, said support having means for the throughpassage of the tearable thread, said one compartment being in gas flow communication with the remaining compartment which gas flow communicates via the equalization opening with the interior of the installation.

* * * * *